United States Patent
Elstermann et al.

(10) Patent No.: US 11,606,627 B2
(45) Date of Patent: Mar. 14, 2023

(54) SYSTEM TO MONITOR AND MANAGE INTEGRATED RECEIVER DECODERS

(71) Applicant: ARRIS Enterprises LLC, Suwanee, GA (US)

(72) Inventors: Erik Elstermann, Carlsbad, CA (US); John Shumate, Encinitas, CA (US); Robert Seymour, La Jolla, CA (US); Todd Kassman, Encinitas, CA (US); Michael Casteloes, Poway, CA (US); Mark Schaffer, Carlsbad, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/217,607

(22) Filed: Mar. 30, 2021

(65) Prior Publication Data
US 2022/0070552 A1     Mar. 3, 2022

Related U.S. Application Data

(60) Provisional application No. 63/070,105, filed on Aug. 25, 2020.

(51) Int. Cl.
| | |
|---|---|
| *H04N 7/16* | (2011.01) |
| *H04N 21/83* | (2011.01) |
| *H04N 21/4402* | (2011.01) |
| *H04N 21/442* | (2011.01) |
| *H04N 21/61* | (2011.01) |

(52) U.S. Cl.
CPC ....... *H04N 21/83* (2013.01); *H04N 21/44209* (2013.01); *H04N 21/440218* (2013.01); *H04N 21/6118* (2013.01); *H04N 21/6125* (2013.01)

(58) Field of Classification Search
CPC .......... H04N 21/83; H04N 21/440218; H04N 21/6125; H04N 21/6118; H04N 21/44209
See application file for complete search history.

(56) References Cited

U.S. PATENT DOCUMENTS

| | | | |
|---|---|---|---|
| 7,089,579 B1 | 8/2006 | Mao et al. | |
| 9,800,933 B1* | 10/2017 | Strothmann | ........... H04N 21/47 |
| 2001/0039584 A1* | 11/2001 | Nobakht | ............ H04N 21/4381 348/E7.071 |
| 2003/0187956 A1* | 10/2003 | Belt | ........................ H04L 67/22 709/219 |
| 2005/0021609 A1* | 1/2005 | Houghton | .......... H04N 21/4143 348/E7.071 |

(Continued)

OTHER PUBLICATIONS

International Search Report and Written Opinion Re: Application No. PCT/US2021/024911 (dated Jul. 30, 2021).

*Primary Examiner* — Gigi L Dubasky
(74) *Attorney, Agent, or Firm* — Chernoff, Vilhauer, McClung & Stenzel, LLP

(57) ABSTRACT

An integrated network receiver includes a first universal resource identifier for a first channel and an input suitable for receiving a first input video content from the Internet based upon the first universal resource identifier. The integrated network receiver provides the first input video content for the first channel to a head end connected to a plurality of customer devices through a transmission network. The integrated network receiver updating the first universal resource identifier based upon data obtained from a video address server.

13 Claims, 5 Drawing Sheets

(56) References Cited

U.S. PATENT DOCUMENTS

| | | | |
|---|---|---|---|
| 2008/0148336 A1* | 6/2008 | Walter | H04N 21/25866 725/137 |
| 2009/0165074 A1* | 6/2009 | Elstermann | H04N 21/6547 725/144 |
| 2011/0314504 A1* | 12/2011 | Ruiz-Velasco | H04N 21/462 725/110 |
| 2016/0366486 A1* | 12/2016 | Huang | H04N 21/4325 |
| 2018/0373748 A1 | 12/2018 | Kuhnke et al. | |

* cited by examiner

SYSTEM TO MONITOR AND MANAGE INTEGRATED RECEIVER DECODERS

CROSS REFERENCE TO RELATED APPLICATIONS

This application claims the benefit of U.S. Provisional Patent Application No. 63/070,105 filed Aug. 25, 2020.

BACKGROUND

The subject matter of this application relates to monitoring and/or managing a commercial integrated receiver decoder network.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
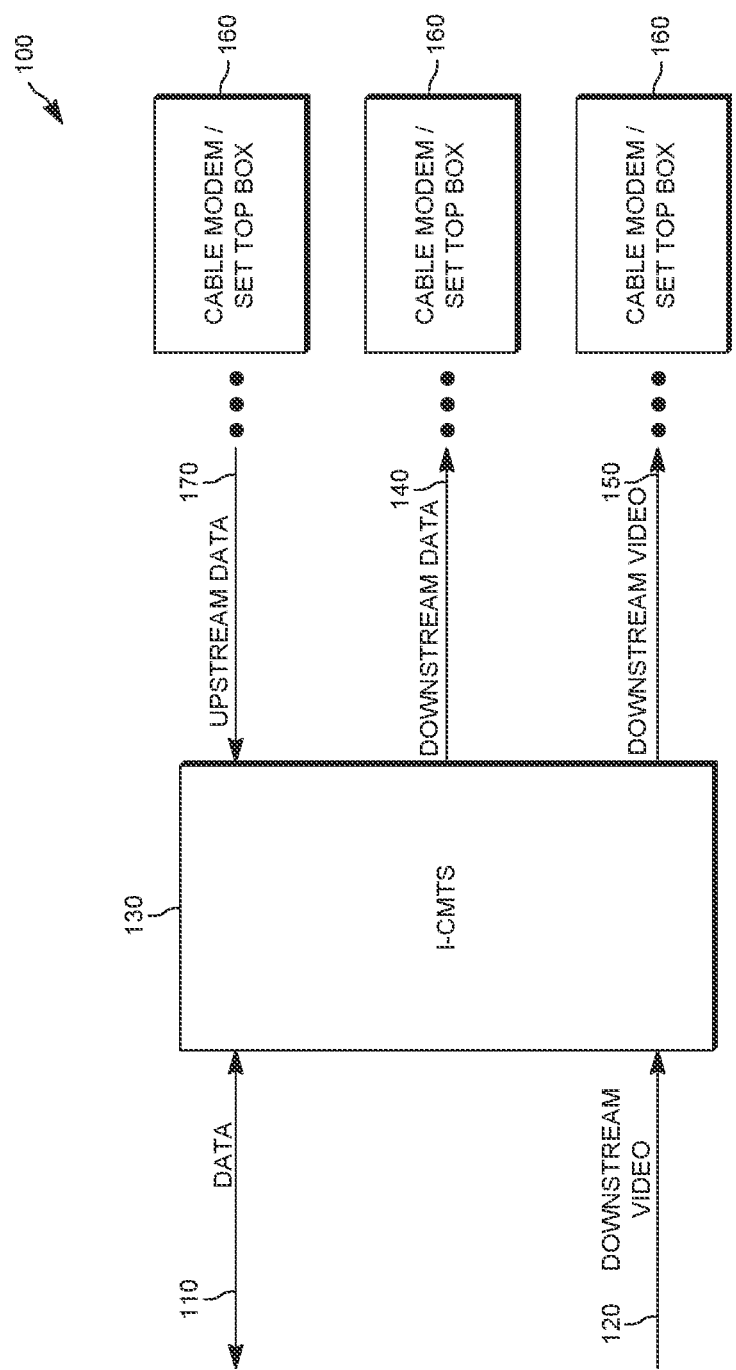
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
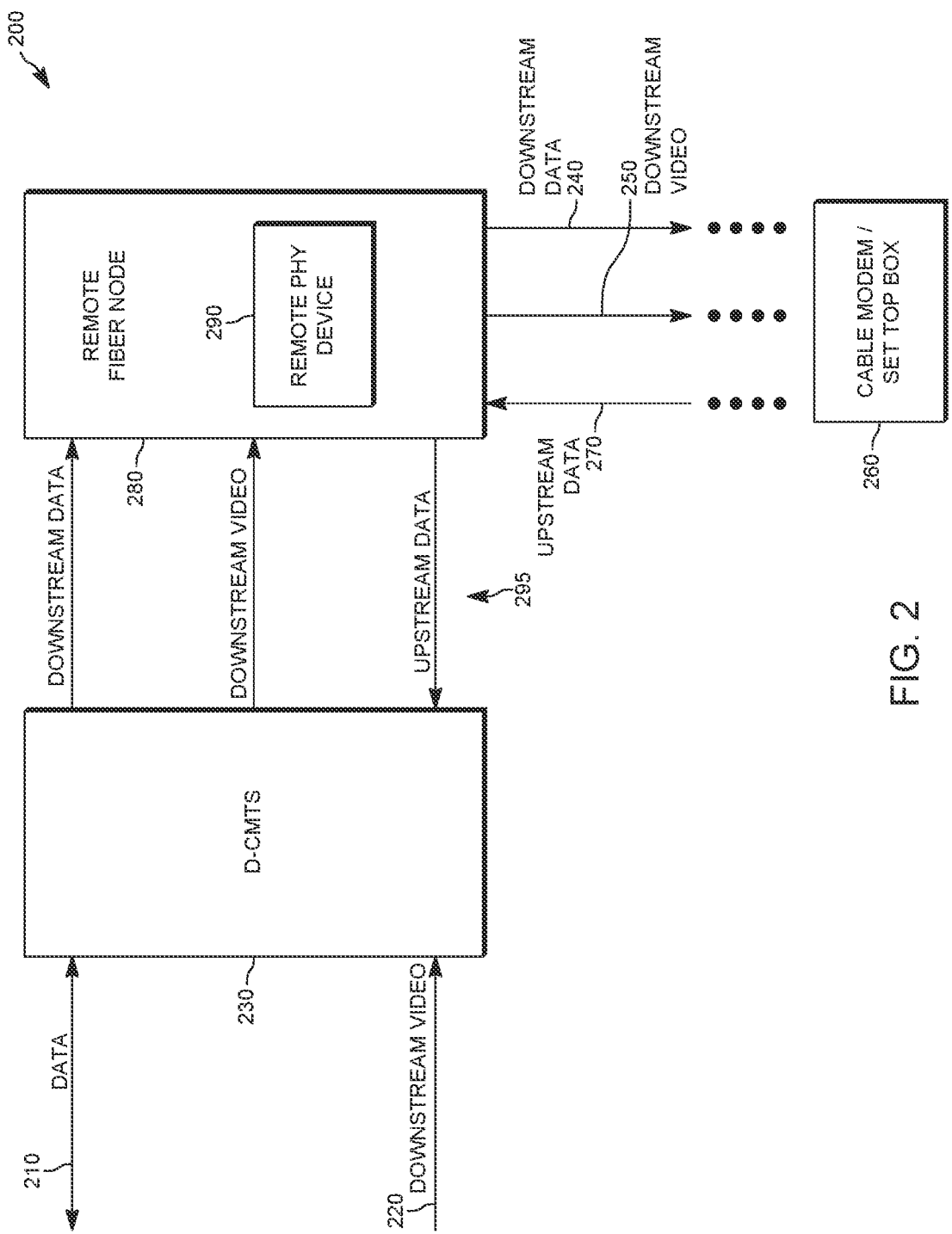
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOC SIS MAC and/or PHY layers down to the fiber node.

In another embodiment, the system does not need to include a CMTS, whether an integrated CMTS or a distributed CMTS, but may use any other type of system for the head end and/or any other type of network for the distribution of content. By way of example, the distribution at the head end may be performed by a set of servers providing data connectivity to the customers through any type of network, inclusive of an optical fiber network, a wireless network, a cellular network, or otherwise.

Figure 3:
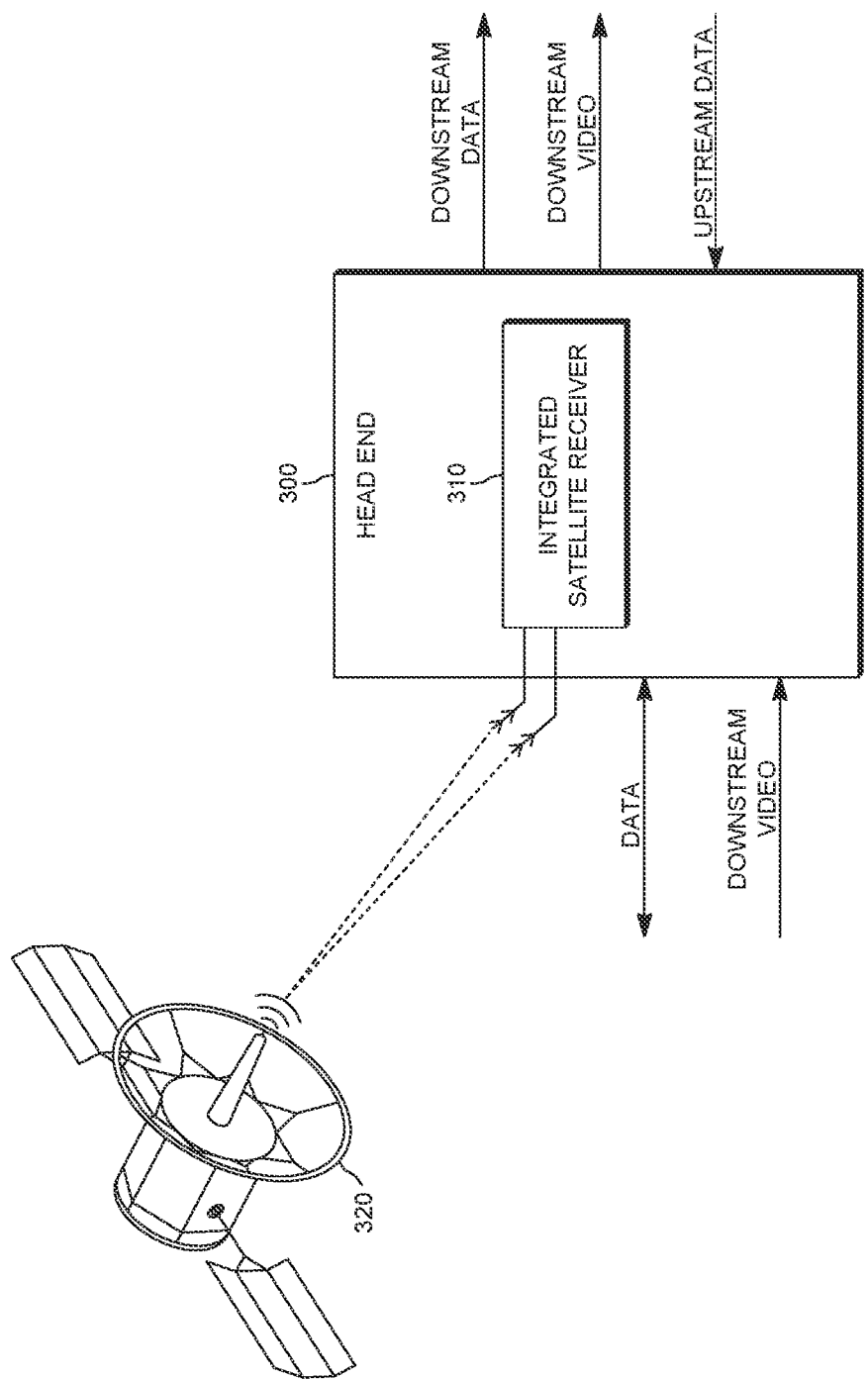
FIG. 3 illustrates a head end together with an integrated satellite receiver.

Referring to FIG. 3, often the head end 300, whether an integrated system or a distributed system or any other type of system, includes an associated integrated satellite receiver 310 for high density transcoding (or pass through) of video content from one or more satellites. The integrated satellite receiver 310 may include one or more active RF tuners with retune capability to receive signals from satellites and one or more network ports, such as Ethernet that provide network connections to the devices of the head end. By way of example, the integrated satellite receiver 310 may transcode the video content of one or more received high definition video signals and/or one or more received standard definition video signals from an input format to an output format.

To install and configure the integrated satellite receiver 310, the integrated satellite receiver 310 is typically mounted in a rack, powered up, and its RF satellite input ports are configured to receive signals from one or more satellites 320. By way of example, the ports may be interconnected to a Galaxy 15 C-Band Horizontal signal and/or a Galaxy 14 C-Band Vertical signal, and/or a Galaxy 14 C-Band Horizontal signal. The integrated satellite receiver 310 may include Ethernet and/or ASI (asynchronous serial interface) outputs that are connected to the head end 300. A set of frequency and modulation parameters are entered on the integrated satellite receiver 310 to gain a signal lock for the satellite signals. By way of example, this may include an input port identification, a frequency, a transponder number, a modulation mode, and/or a symbol rate. Generally, an authorization for the integrated satellite receiver 310 is obtained based upon a unit address for the integrated satellite receiver 310 from a content provider so that it may receive and properly decode the video signals from the content provider provided from the satellite(s) 320. By way of example, the content providers may include, ABC, CBS, CW, ION, Dish, NBC, PBS, A&E, ACCN, ESPN, AHC, AMC, BBC AMERICA, BTN, Bloomberg TELEVISION, CNN, HBO, and/or BRAVO. The content received and transcoded (or passed through) by the integrated satellite receiver 310 is then provided to the head end 300, which in turn distributes the content to local and regional subscribers to the content.

In most instances, after configuring the integrated satellite receiver 310 using its interface which is small and prone to error, the frequency and modulation parameters are unlikely to change for a substantial period of time, such as several months to several years. Accordingly, there is limited need to reconfigure the integrated satellite receiver 310 after its initial configuration. While being limited to satellite communications, the integrated satellite receiver 310 is not suitable for Internet based video content because it is problematic to program such an Internet based uniform resource locator and/or uniform resource identifier (generally collectively referred to herein as uniform resource identifier "URI") into the integrated satellite receiver 310, and the URIs tends to change on a more dynamic basis, making it problematic to modify the settings of the integrated satellite receiver 310 to maintain the current URI being used for each particular video stream. By way of example, the content providers may elect to change content distribution networks on a frequent basis, depending on a variety of factors including network performance and expense. Also, in the case of multiple integrated satellite receiver(s) 310, each would need to have its settings modified to maintain the current URI being used for that particular integrated satellite receiver for each associated particular video stream.

Figure 4:
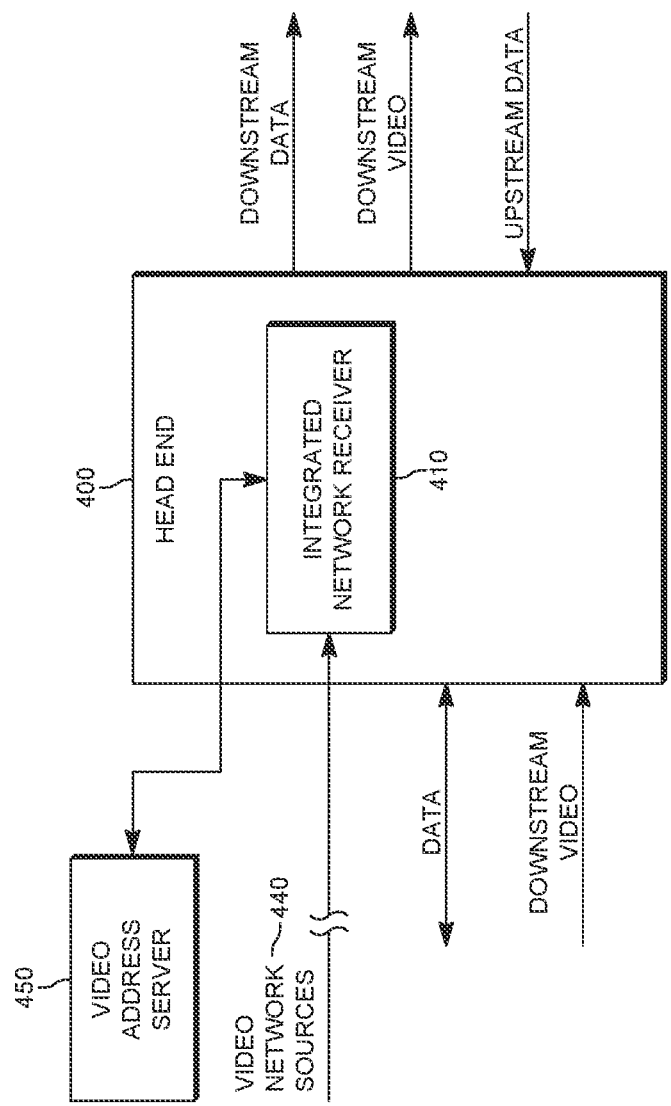
FIG. 4 illustrates a head end together with an integrated network receiver and a video address server.

Referring to FIG. 4, the head end 400 of a cable system, whether an integrated system or a distributed system, includes an associated integrated network receiver 410 for high density transcoding (or pass through) of video content from a packet based Internet network source, such as a video content server. The integrated network receiver 410 may include one or more network ports to receive the Internet based signals, and one or more network ports, such as Ethernet and ASI, that provide network connections to other devices of the head end. By way of example, the integrated network receiver 410 may transcode the video content of one or more received high definition video signals and/or one or more received standard definition video signals, or otherwise provide a pass through, from an input format to an output format (or otherwise the same format).

To install and configure the integrated network receiver 410, the receiver 410 is typically mounted in a rack, powered up, and its network inputs are connected to receive signals from one or more Internet video network sources 440, such as video servers. By way of example, the network inputs may receive Internet based data from various network servers, such as cloud based network servers. For example, some cloud based networks may include Amazon Web Services, Google Cloud Platform, Microsoft Azure, IBM Cloud, Oracle Cloud, VMware Cloud, Dell Technologies Cloud, and/or private servers/clouds. The integrated network receiver 410 preferably queries a video address server 450 through a network connection to obtain one or more Internet Protocol based URI addresses for respective video sources to be provided to the head end 400. Preferably the video address server 450 provides a respective URI for a respective video content for a channel. By way of example, the URI may have the following format: URI=scheme:[//authority]path[?query][#fragment]. Generally, an authorization for the integrated network receiver 410 is obtained based upon a unit address for the integrated network receiver 410 from a content provider so that it may receive and properly decode the video signals from the content provider provided through the Internet. By way of example, the content providers may include, ABC, CBS, CW, ION, Dish, NBC, PBS, A&E, ACCN, ESPN, AHC, AMC, BBC AMERICA, BTN, Bloomberg TELEVISION, CNN, HBO, and/or BRAVO. The content received and transcoded (or passed through) by the integrated network receiver 410 is then provided to the head end 400, which in turn distributes the content to local and regional subscribers to the content.

Figure 5:
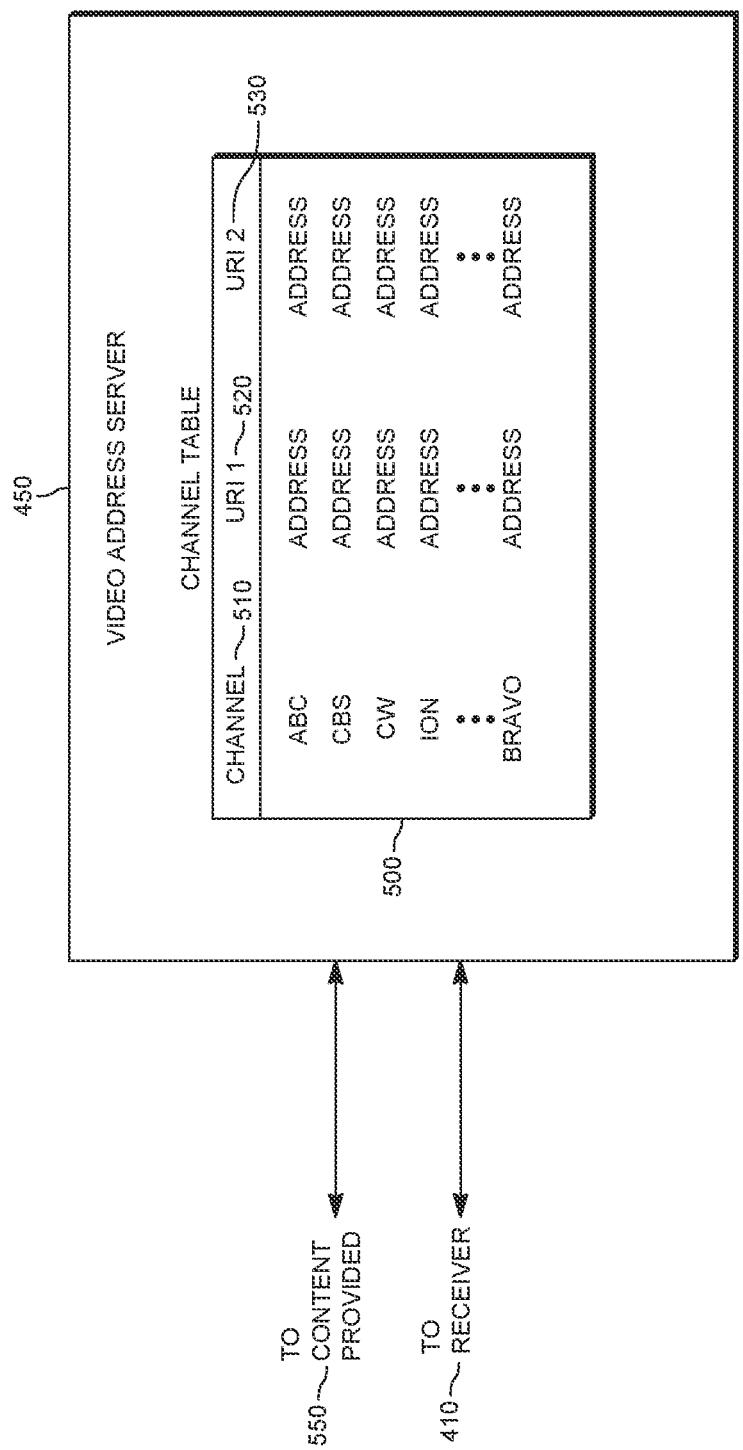
FIG. 5 illustrates a video address server.

Referring to FIG. 5, the video address server 450 includes a channel table or other data structure 500 that includes a list of one or more channels 510. Each of the channels 510 may include an associated URI 1 520, which is a primary network address for the video content. Each of the channels 510 may include an associated URI 2 530, which is a secondary network address for the video content. Additional URIs for each channel may be included if desired. A content provider or otherwise 550 may update the channel table 500 using a network connection when the URIs for the content are updated or otherwise modified, such as setting or otherwise changing of the primary URI and/or the secondary URI. The integrated network receiver 410 queries the video address server 450 and obtains the channel list (if not already obtained or defined) and obtains the associated URI 1 520 and URI 2 530 (and additional URIs if available). The channels and URIs maybe globally defined, or defined for one or more integrated network receivers. The integrated network receiver 410 uses the URIs that are obtained from the video address server 450 to obtain the video content, which is then provided to the head end, and the head end distributes the video content to the customers. The integrated network receiver 410 periodically receives an updated channel list, if desired, together with updated associated URI 1 520 and URI 2 530 (and additional URIs if available), from the content provider. Also, an integrated network receiver and/or a group of integrated network receivers may be triggered to query for updates based upon data (e.g., commands) received from the content provided, included within the content being processed.

As it may be observed, the content provider 550 may update the channel table 500 of the video address server 450, which may occur on an hourly, daily, weekly, or otherwise based upon the preferences of the content provider. For example, the content provider 550 may determine that another network is providing a higher quality of service or otherwise another network is providing a less expensive service, for the delivery of video content to the integrated network receiver 410. Based upon this determination, the content provider 550 may update the URI 1 and/or URI 2 of the channel table 500 of the video address server 450. The integrated network receiver 410 uses the URI 1 520 to receive the video content, and if the video content is not available based upon URI 1 520, then the integrated network receiver 410 switches to the URI 2 530 to receive the video content. In this manner, the system has a built in redundancy feature for obtaining the video content from multiple sources. Additional URIs may likewise be used, if desired. Providing a channel table 500 that is separate from the video content itself simplifies the identification of the desired URIs that are intended to be used, rather than a complicated signalling of the URIs in-band with the video content. The simplification of the identification of the desired URIs when different receivers are using different URIs for the same video content.

The integrated network receiver 410 may be installed at the head end of a cable system. The integrated network receiver 410 may be provided with program identifications for a channel line up of one or more channels, or otherwise the channel line up of one or more channels (all of which is generally referred to as a channel or channels). The program identification and/or channel line up assigned to the receiver may be obtained from the video address server 450, if desired. Based upon the program identification and/or the channel line up, the integrated network receiver 410 is populated with mapping information between the channel line up and the URIs (URI 1 520 and URI 2 530). The integrated network receiver 410 then receives content from the URI 1 520 locations, and if content is not available from URI 1 520 locations, the integrated network receiver 410 receives content from the URI 2 530 locations, for respective channels. Preferably, after activating the integrated network receiver 410, it automatically interconnects with the video address server 450, and configures itself based upon information in the channel table 500, including the channel line up. This automatic configuration may further include obtaining authorization from a content provider to receive the video content, and decrypt the video content if necessary.

The integrated network receiver 410 may monitor network parameters of the received video content on the URIs. For example, the integrated network receiver 410 may determine one or more parameters, such as for example, a quality of service for each video stream, may determine a latency for each video stream, may determine packet losses for each video stream, may determine a bit rate for each video stream, may determine a transmission delay for each video stream, may determine an availability for each video stream, may determine a jitter for each video stream, may determine a goodput for each video stream, may determine errors for each video stream, may determine a packet delay variation for each video stream, may determine an out-of-order delivery for each video stream, etc. In addition, the integrated network receiver 410 may also receive pricing information for various networks. The integrated network receiver 410 may likewise determine the parameters as it relates to geographic regions that the video content originates from, such as the West Coast of the United States and the East Coast of the United States. The integrated network receiver 410 may concatenate such parameters, if desired, and provide parameter information to the content provider or cable provider so that they may evaluate the network performance for the video content. Based upon the network performance of different network providers, such as based upon their URIs, a determination may be made of which network provider provides superior service. Based upon the service determinations, which may further be based upon pricing information, the content provider may update the channel table 500 to reflect the service determinations.

A set of integrated network receivers may be used to provide services for a plurality of different channels based upon data obtained from the video address server. The set of integrated network receivers may collectively operate with a head end to provide a channel line up for Internet Protocol based video services, where each of the integrated network receivers provides different channels. The set of integrated network receivers provide the video content to the head end, which in turn, distributes the video content to the customers.

The video address server 450 in combination with the integrated network receiver(s) may be used to effectively transition from one set of primary URI sources to another set of primary URI sources in a manner that doesn't impact the service. For example, an integrated network receiver may have a first set of URI 1 and URI 2, where the video content is being provided though URI 1. An updated primary may be achieved by terminating the availability of the video content from URI 1. As a result, the integrated network receiver automatically switches to the secondary URI 2 to continue to receive the video content. The URI 1 is updated at the channel table 500, which is then subsequently obtained by the integrated network receiver. The integrated network receiver will subsequently switch to obtaining the video content from URI 1, if the video content is available from the new URI 1.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. An integrated network receiver including a processor comprising:
    (a) said integrated network receiver includes a first universal resource identifier (URI) for a first channel from a video address server based upon a first predefined URI maintained by said integrated network receiver prior to being provided video content for said first channel from a first source over a first transmission medium, said integrated network receiver includes a second universal resource identifier for said first channel from said video address server based upon a second predefined URI maintained by said integrated network receiver prior to being provided video content for said first channel from said first source over said first transmission medium, said integrated network receiver selectively including an input suitable for receiving either (a) a first input video content from said first source over said first transmission medium from Internet based upon said first universal resource identifier or (b) a second input video content from said first source over said first transmission medium from the Internet based upon said second universal resource identifier, wherein said integrated network receiver further obtains authorization from a content provider of said first input video prior to receiving said first input video;
    (b) said integrated network receiver providing said first input video content for said first channel to a head end connected to a plurality of customer devices through a transmission network, where said integrated network receiver provides said first predefined URI or said second predefined URI for said first channel to each of said plurality of customer devices to receive said first input video;
    (c) said integrated network receiver updating at least one of said first universal resource identifier and said second predefined URI based upon data obtained from said video address server, wherein said integrated network receiver receives update from said content provider for said first and second predefined URIs of said first channel of a channel table in said video address server.

2. The integrated network receiver of claim 1 wherein said integrated network receiver receiving said second universal resource identifier for said first channel based upon a request to said video address server.

3. The integrated network receiver of claim 2 wherein said integrated network receiver switching from receiving said first input video content based upon said first universal resource identifier to said second universal resource identifier when said video content is not available based upon said first universal resource identifier.

4. The integrated network receiver of claim 3 wherein said integrated network receiver updating said second universal resource identifier based upon data obtained from said video address server.

5. The integrated network receiver of claim 4 wherein said integrated network receiver switching from receiving said first input video content based upon said second universal resource identifier to said first universal resource identifier when said video content is available based upon said first universal resource identifier.

6. The integrated network receiver of claim 1 wherein said first input video content is transcoded and said transcoded first input video content is provided as said first input video content for said first channel to said head end.

7. The integrated network receiver of claim 1 wherein said data obtained from said video address server is through a network connection.

8. The integrated network receiver of claim 1 wherein said first universal resource identifier is updated on said video address server through a network connection.

9. The integrated network receiver of claim 4 wherein said second universal resource identifier is updated on said video address server through a network connection.

10. The integrated network receiver of claim 1 wherein said integrated network receiver includes a plurality of additional channels and a plurality of corresponding additional universal resource identifiers, one of which is associated with a respective additional channel.

11. The integrated network receiver of claim 1 further comprising monitoring network parameters related to said first input video content.

12. The integrated network receiver of claim 11 wherein said network parameters include at least one of a quality of service for said first input video content, a latency for said first input video content, packet losses for said first input video content, a bit rate for said first input video content, a transmission delay for said first input video content, an availability for said first input video content, a jitter for said first input video content, a goodput for said first input video content, errors for said first input video content, a packet delay variation for said first input video content, and an out-of-order delivery for said first input video content.

13. The integrated network receiver of claim 2 wherein said integrated network receiver switching from receiving said first input video content based upon said first universal resource identifier to said second universal resource identifier based upon network parameters related to said first input video content.

* * * * *